United States Patent [19]

Tanii

[11] Patent Number: 5,490,928

[45] Date of Patent: Feb. 13, 1996

[54] TANDEM WATERWHEEL TROMMEL

[75] Inventor: Masao Tanii, Kumamoto, Japan

[73] Assignee: Tanii Indusries Co., Ltd., Kumamoto, Japan

[21] Appl. No.: 323,542

[22] Filed: Oct. 17, 1994

[51] Int. Cl.$^6$ ................................................. B07B 1/22
[52] U.S. Cl. .................... 210/380.3; 209/3; 209/240; 209/270; 209/288; 209/369; 210/391; 210/393; 210/394; 210/347; 366/30; 366/60; 366/228; 366/601
[58] Field of Search .......................... 209/3, 239, 240, 209/270, 288, 369, 379; 210/380.1, 380.3, 391, 393, 394, 396, 397, 512.1; 366/18, 30, 60, 228, 601

[56] References Cited

U.S. PATENT DOCUMENTS

| 4,543,180 | 9/1985 | Riker | 366/228 |
|---|---|---|---|
| 5,082,553 | 1/1992 | Tanii | 209/288 |
| 5,110,466 | 5/1992 | Tanii | 210/225 |

FOREIGN PATENT DOCUMENTS 2418802  9/1992  Japan .

Primary Examiner—Robert A. Dawson
Assistant Examiner—David Reifsnyder
Attorney, Agent, or Firm—Price, Heneveld, Cooper, DeWitt & Litton

[57] ABSTRACT

A tandem waterwheel type trommel apparatus having a laterally-disposed drain-off drum and a laterally-disposed classifying drum combined through a short pipe to form a main body, which is rotatably disposed on a base and is connected to a drive unit. A front end plate and a rear end plate each having a doughnut-like shape are respectively provided at the front and rear ends the drain-off drum. A plurality of buckets are provided in the drain-off drum, and gutters are provided on the back side of upper end portions of the buckets. The gutters communicate with drain holes formed in the rear end plate. A fixed shoot is provided which extends through the drain-off drum to the classifying drum. The classifying drum has a cylindrical portion and a truncated-cone portion. A circumferential member of truncated-cone portion is made porous while a circumferential member of the cylindrical portion is formed of a wire netting. A screw is provided on the outer circumferential surface of the cylindrical portion. The classifying drum is accommodated in semicylindrical fixed bath. A water washing sprayer is provided above the cylindrical portion.

2 Claims, 4 Drawing Sheets

TANDEM WATERWHEEL TROMMEL

BACKGROUND OF THE INVENTION

1. Field of the Invention

The present invention relates to a tandem waterwheel type trommel apparatus for recovering aggregates such as sand and gravel from returned concrete remaining in a concrete mixer truck after discharge of freshly mixed concrete at a building site and from waste water after washing the mixer of the concrete mixer truck (which materials are generically called as sludge)

2. Description of the Related Art

This kind of trommel apparatus includes various well-known various types of trommel apparatuses: (A) one in which coarse aggregates such as sand and gravel are separated by a rotating cylindrical wire netting, and sand is thereafter scooped up by a screw conveyor from sludge containing sand, (B) one in which a cylindrical wire netting is rotatably disposed in a laterally-disposed semicylindrical bath fixed on a base and having an inside diameter larger than the diameter of the cylindrical wire netting, and an inner screw and an outer screw are disposed along the inner and outer surfaces of the cylindrical wire netting to form a classifying drum, the inner screw being formed so as to move coarse aggregates such as gravel to a rear outlet, and in which the outer screw is operated to run sand into a rear accumulation section, and this sand is scooped up and discharged out of the bath by scooping blades, and (c) one in which an internal space of a laterally-disposed rotating cylindrical drum is partitioned by doughnut partition plates to form a mix-washing bath, an overflow transport bath and a trommel bath in the order from the upstream side, and in which sludge is thrown into the mix-washing bath to be mixed and washed, sand and gravel are scooped up by scoop blades and supplied to the trommel bath to be separated, and remaining water is caused to overflow into the overflow transport bath and is returned to the mix-washing bath by buckets (an invention made by the inventor of the present invention, U.S. Pat. No. 5,082,553).

Another type of trommel apparatus has been invented by the inventor of the present invention and an application for it has been filed with the Japanese Patent Office (Japanese Patent Application No. Hei 2-418802) which consists of (D) a combination of a trommel for separating coarse aggregates such as gravel and another trommel for separating fine aggregates such as sand, which are disposed on the same base with a certain difference in level set therebetween, whereby two-stage classification of sludge is made.

The trommel apparatuses (A) and (B), however, are of a one-bath type such that sludge is directly flows into a bath for separating sand and gravel, wherein a trommel is incorporated and aggregates classified thereby are scooped up and moved out of the surface of sludge by scoop-up blades or the like. Accordingly, if returned concrete is supplied, the sludge concentration becomes so high that a substantially large amount of cement component is attached to recovered aggregates. Aggregates in such a state cannot be directly reused. Moreover, a washing water discharged from a concrete mixer truck flows directly into such a one-bath trommel to cause a large change in flow rate, while the trommel in the both is constantly rotated. The inflow is therefore disturbed at the time of discharge from the mixer truck, so that fine sand is drawn into waste water to flow out through a drain port, resulting in failure to recover fine sand.

The trommel apparatus (C) is of a two-bath type such that sludge flows into a mix-washing bath, and aggregates are scooped up therein with blades to enter a trommel bath and are classified and rinsed by a trommel incorporated in this bath. Recovered aggregates can be thereby washed with water sufficiently. However, the two baths are rotated integrally with each other, the flow in the mix-washing bath is disturbed, so that fine sand cannot be suitably recovered. There is also a problem of difficulty in maintenance, e.g., in removing a clog in the trommel since the trommel is incorporated in a cylinder.

The trommel apparatus (D) is a tandem waterwheel type trommel in which coarse aggregates are recovered in the first bath, sludge is successively scooped up by waterwheel buckets to cause aggregates to settle in each bucket, and water is drained off as overflowing water. It is therefore possible to reliably recover fine sand. However, no water washing step is provided, as in the case of the types (A) and (B).

In view of the above-described drawbacks of the conventional art, an object of the present invention is to provide a trommel apparatus capable of sufficiently washing recovered aggregates with water as well as completely recovering fine sand.

Another object of the present invention is to provide a trommel apparatus capable of recovering aggregates reusable as freshly mixed concrete by resupplying water at a smaller rate.

Still another object of the present invention is to provide a trommel apparatus capable of suitably processing mixer truck washing water and returned concrete simultaneously.

SUMMARY OF THE INVENTION

To achieve these object, according to the present invention, there is provided a trommel apparatus having a laterally disposed drain-off drum and a laterally-disposed classifying drum which are combined coaxially and integrally with each other through a short pipe to form a main body. The main body is rotatably disposed on a base. A drive unit for rotating the main body is also provided on the base and connected to the main body. A front end plate and a rear end plate each having a doughnut-like shape are respectively formed at opposite ends of the drain-off drum. A plurality of buckets are formed on an inner surface of the drain-off drum. Gutters are provided on the back side of upper end portions of the buckets.

These gutters are arranged so that water contained in the buckets is caused to flow into the gutters as the buckets are inclined with the rotation of the drain-off drum. The gutters communicate with drain holes which are formed in the rear end plate to provide communication between the outside of the main body and the gutters. The drain holes are formed slightly higher in elevation than bottom surfaces of the gutters so that water overflows during the rotation of the gutters in the range from a lower position to a generally-horizontal position. A plurality of overflow holes are formed in the rear end plate in the vicinity of the drain holes. A fixed shoot is provided inside the drain-off drum, extending to the classifying drum and inclined so as to be reduced in level in a rearward direction.

The fixed shoot is arranged so that water in each bucket is discharged to the corresponding gutter and to the corresponding discharge hole by an inclination of the bucket, and remaining aggregates are caused to fall onto the fixed shoot by a further inclination of the bucket to be supplied to the classifying drum.

A sludge shoot is disposed below the fixed shoot to supply sludge from the outside. The gutters are formed so as not to extend to a position corresponding to a lower end opening of the sludge shoot.

The classifying drum has a front cylindrical portion and a rear truncated-cone portion. Screw blades are provided on an inner surface of the classifying drum. The truncated-cone portion is formed by a porous plate defining its circumferential surface, while the cylindrical portion is formed by wire netting defining its circumferential surface. The classifying drum is accommodated in an immersed fashion in a fixed bath provided on the base and having a circular-arc shape in a transverse section. A screw blade is provided on an outer surface of the classifying drum. The screw blade is rotatable in the fixed bath. A channel having a circular-arc shape in section is formed in a rear end portion of the fixed bath. Scoop-up buckets are provided on the classifying drum and formed so as to be rotatable in the channel. A spraying nozzle is provided above the classifying drum.

Sludge introduced from the outside of the apparatus is supplied from the sludge shoot to the rotating drain-off drum and is scooped up by the internal buckets thereof. Aggregates such as sand sediment in the buckets. As each bucket is inclined by rotation, water in the bucket overflows into the gutter on the back side of the bucket. The water then flows to the drain hole of the rear end plate to be discharged through the same. Aggregates in the bucket from which water has been removed and fine sand remaining in the gutter are caused to fall onto the fixed shoot by a further increase in the inclination of the bucket. They slide on the fixed shoot supplied to the classifying drum and are classified into sand and gravel by a screen while being washed with washing water in the fixed bath and showering water from above. The sand is moved by the screw to advance through the fixed bath, falls into the channel at the rear end and are then put out by the scoop-up buckets provided on the classifying drum. On the other hand, coarse aggregates such as gravel are discharged through a rear end portion of the classifying drum.

A large-scale apparatus based on this arrangement may be constructed so that the drain off drum and the classifying drum are separately driven. This is because the number of revolutions of the drain-off drum is limited since it operates mainly to cause sedimentation in the buckets, while the number of revolutions of the classifying drum may be several times larger. The mesh size of the outer circumference porous plate of the truncated cone portion may selected so as to be larger than that of the wire netting of the cylindrical portion, if it is desirable to recover coarse aggregates while further classifying them with respect to the gain size.

DESCRIPTION OF THE PREFERRED EMBODIMENT

Figure 1:
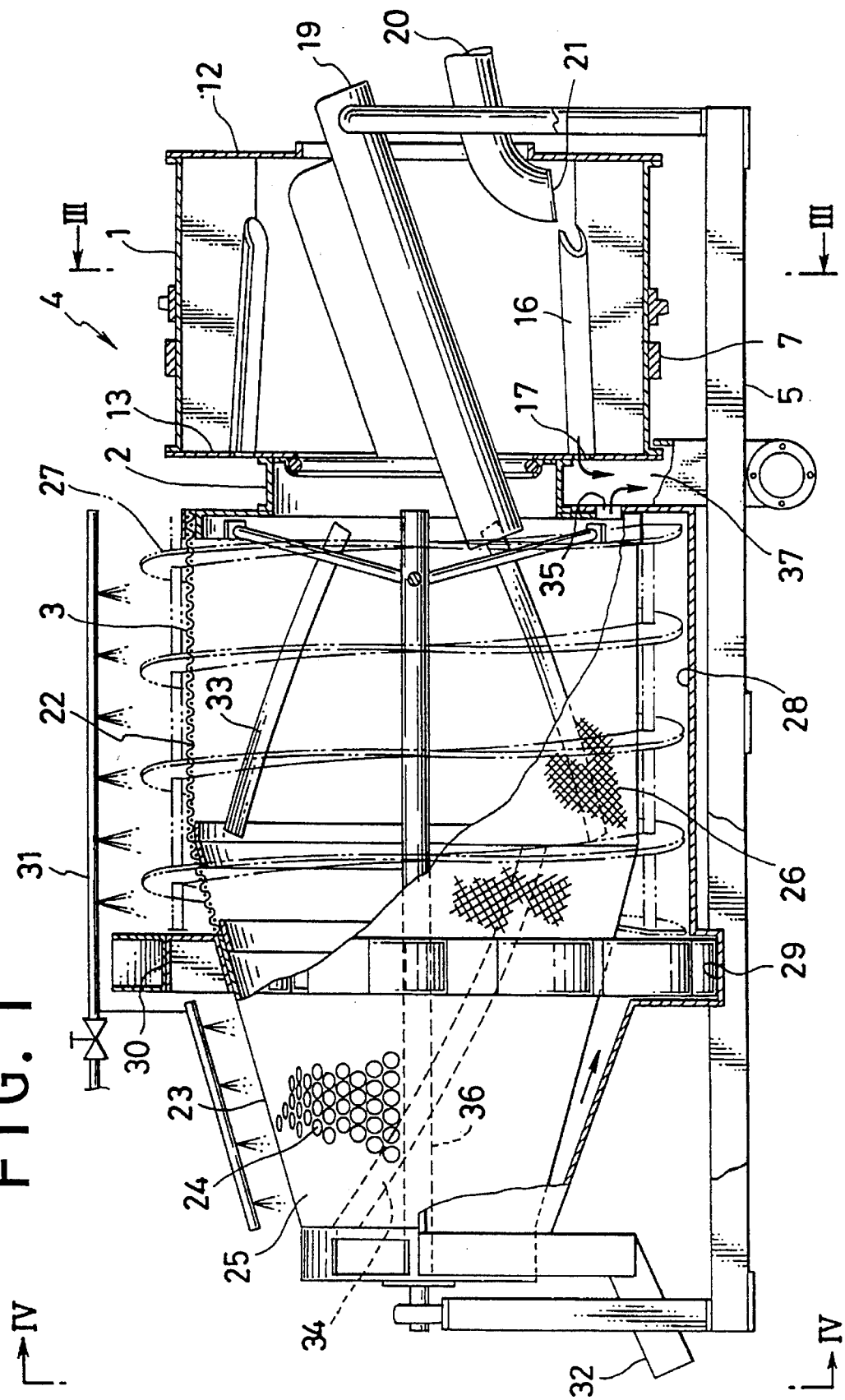
FIG. 1 is a partially sectional front view of first embodiment of a tandem waterwheel type trommel apparatus in accordance with the present invention.
Figure 2:
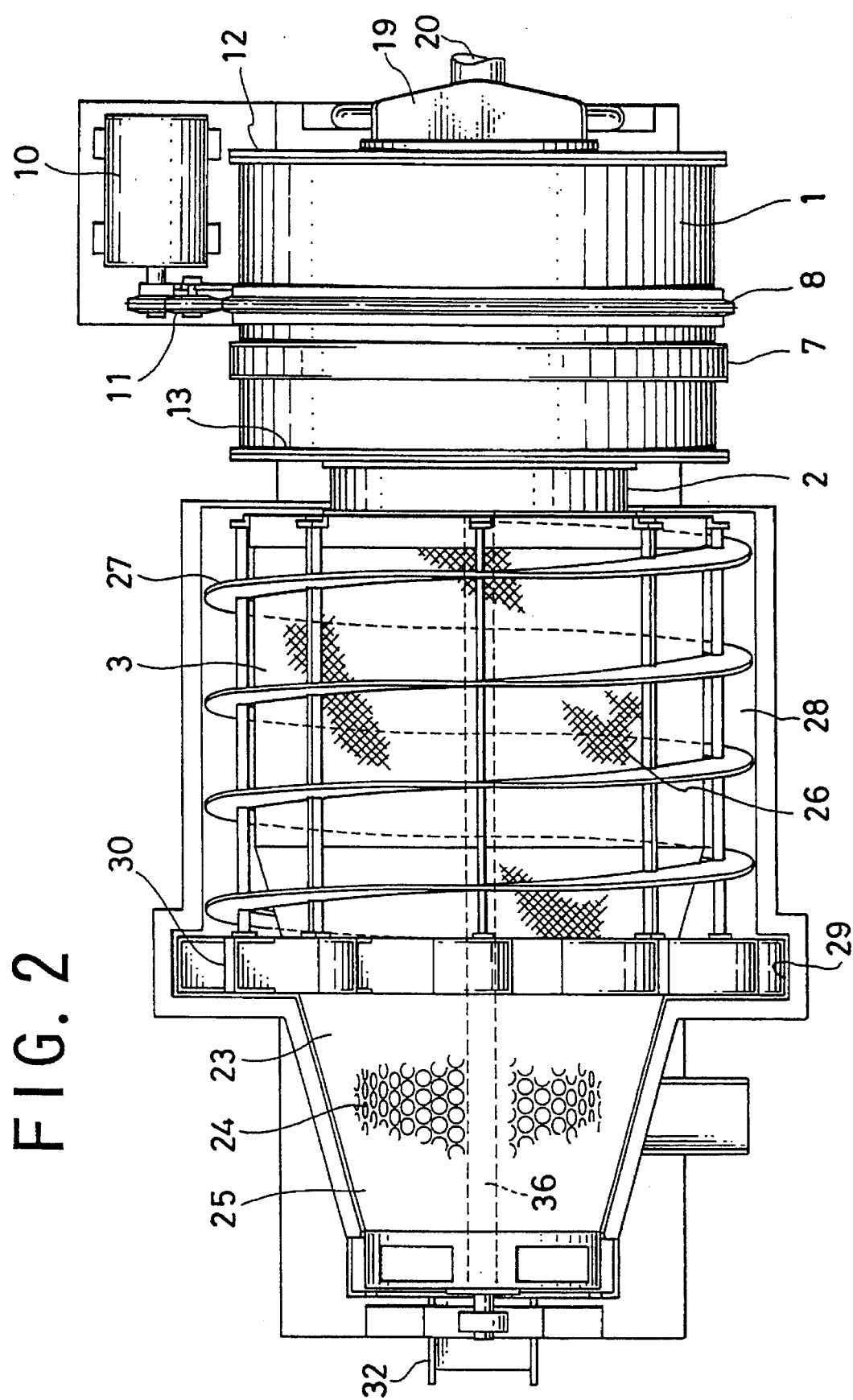
FIG. 2 is a plan view of the apparatus shown in FIG. 1.
Figure 3:
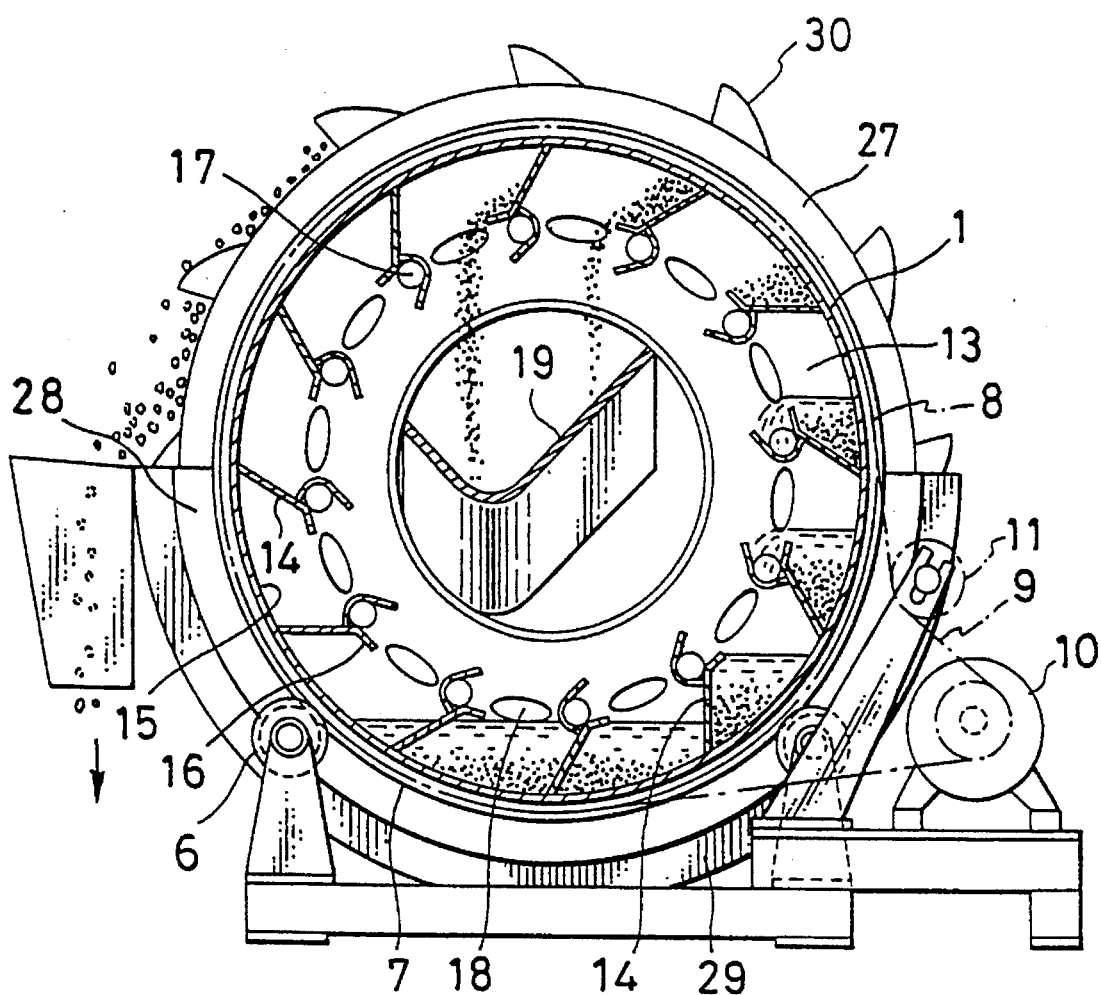
FIG. 3 is a cross-sectional view taken along the line III—III of FIG. 1.
Figure 4:
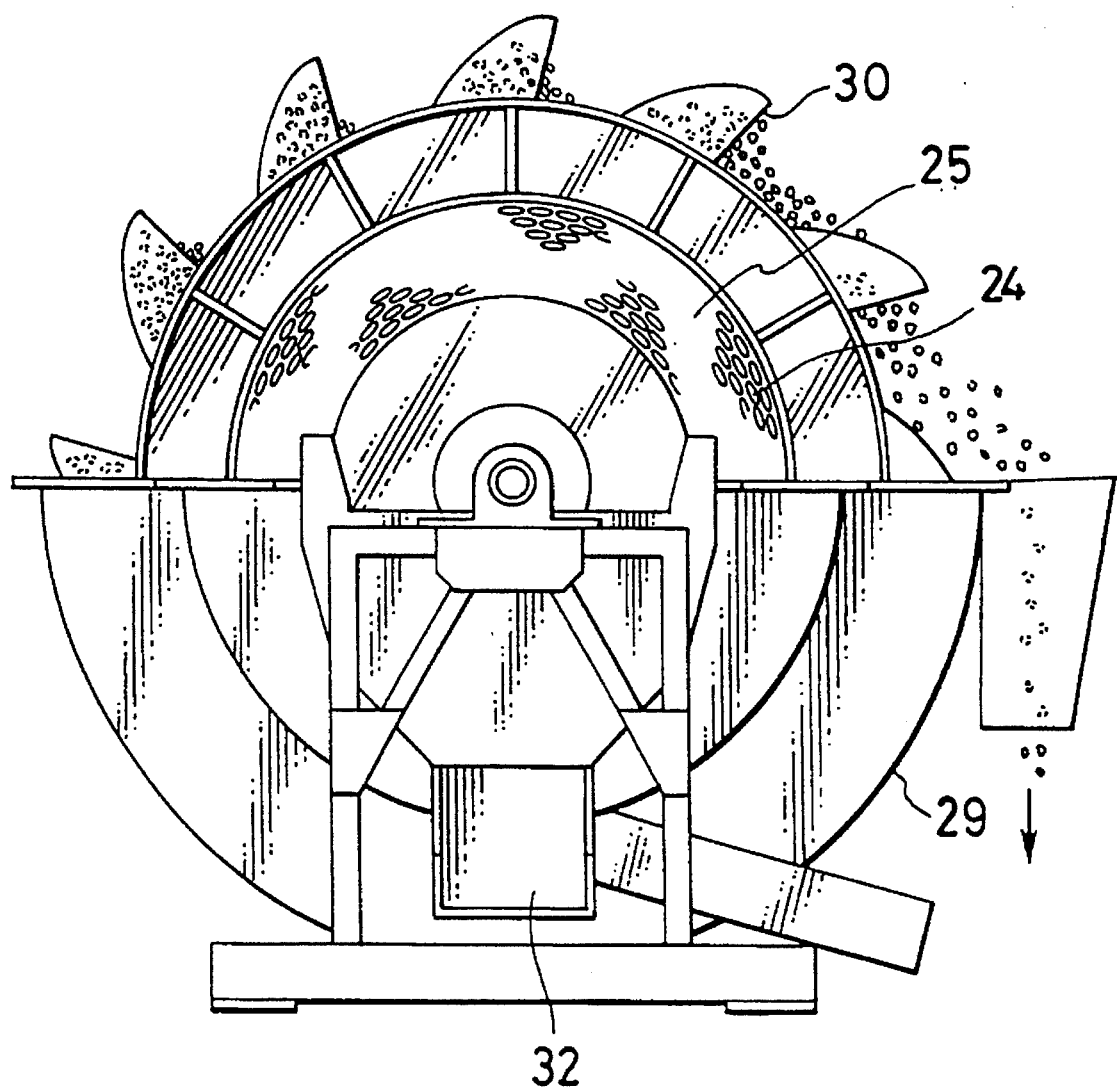
FIG. 4 is a side view seen as indicated by arrows IV.

FIGS. 1 through 4 show a tandem waterwheel type trommel apparatus. A drain-off drum 1 is integrally connected to a classifying drum 3 through a short pipe 2 to form a main body 4. The main body 4 is rotatably supported on a base 5.

A supporting roller 6 is provided to support the base 5. A rail 7 is formed around the drain-off drum 1. A sprocket 8 (FIG. 2) is also formed on the drain-off drum 1, and is connected through a chain 9 to a drive unit 10 provided on the base 5. A tensioner 11 is provided to tense the chain 9.

A front end plate 12 and a rear end plate 13 each having a generally doughnut-like shape are respectively provided at the front and rear ends of the drain-off drum 1. A plurality of buckets 14 are provided inside the drain-off drum 1. An inner surface 15 of the drain-off drum 1 is utilized as a part of each bucket 14. Gutters 16 (FIG. 3) are formed on the back side of each bucket 14. The gutters 16 communicate at their rear ends with drain holes 17 formed in the rear end plate 13.

Overflow holes 18 are formed in the vicinity of the drain holes 17. Both the drain holes 17 and the overflow holes 18 open to the outside of the main body 4.

A fixed shoot 19 is formed so as to have a concave sectional shape. The shoot 19 extends obliquely through the drain-off drum 1 to the classifying drum 3. A sludge shoot 20 is provided for communication between the outside and the interior of the drain-off drum 1. The gutters 16 are formed by being cut so as not to extend to a position correspond to a lower end opening 21 of the sludge shoot 20.

A sludge supplied through the sludge shoot 20 is scooped up by the buckets 14. Aggregates such as sand and gravel in the rotating buckets 14 sink toward the bottoms, while cement water stays above the aggregates. In this state, as the drain-off drum 1 is rotated, the buckets 14 are successively inclined, so that cement water contained in each bucket 14 flows into the corresponding gutter 16 provided on the back side of the bucket 14. The cement water then flows out of the drain hole 17 in an overflowing manner by the effect of a basin which is defined by a difference in level between the bottom surface of the gutter 16 and the corresponding drain hole 17, and which serves to prevent fine sand from flowing out. The cement water flows to the outside of the main body 4 through the drain holes 17. Since aggregates also sink at the bottom of the drain-off drum 1 and separate from water which exists above the aggregates, cement water also overflows through some of the overflow holes 18. It is therefore possible to suitably process mixer washing water introduced during processing of returned concrete so that only cement water flows out.

After cement water has been removed from one of the buckets 14 and the corresponding gutter 16, the aggregates in the bucket 14 and the gutter 16 fall onto the fixed shoot 19 as the inclination of each bucket is increased, and slide downward on the fixed shoot 19 to be introduced into the classifying drum 3. The classifying drum 3 has a front cylindrical portion 22 and a rear truncated-cone portion 23. The truncated cone portion 23 is formed of a porous plate 25 to have a multiplicity of through holes 24 in its surface. The cylindrical portion 22 is formed of a wire netting 26. A screw 27 is formed on the periphery of the cylindrical portion 22. As illustrated, the thus-formed classifying drum 3 is accommodated in an immersed fashion in a fixed bath 28 which is provided on the base 5 and which has a circular-arc shape as viewed in a transverse section. A channel 29 also having a circular-arc shape as viewed in a transverse section is formed at the rear end of the fixed bath 28. Scoop-up buckets 30 provided on the classifying drum 3 are rotatably accommodated in the channel 29. A water washing nozzle 31 is provided above the classifying drum 3. The water washing nozzle 31 communicates with a water source (not shown) for showering. A member 32 shown in FIG. 1 is an outlet for discharging coarse aggregates such as gravel. Internal screws 33 and 34 are provided which serve not only to move aggregates rearward but also to lift the aggregates that they are carrying and then to cause the aggregates to fall so that the aggregates are sufficiently washed in the air by being showered with water from the washing nozzle 31.

Showering water used for washing coarse aggregates in this manner is resupplied for sand washing. Waste water made turbid by sand washing is discharged out of the apparatus through a discharge port 35 of the fixed bath and through a waste water receiving bath 37, which also receives water discharged from the drain-off drum 1.

As mentioned above, aggregates entering the classifying drum 3 from the fixed shoot 19 are moved rearward by the internal screws 33 and 34 with the rotation of the drum 3 while being washed by being showered and are separated outside and inside the wire netting 26. Sand and the like including fine sand are moved toward the rear end of the fixed bath 28 while being washed with wager, are introduced into the channel 29 and are scooped up by the scoop-up buckets 30 to be put out.

On the other hand, coarse aggregates such as gravel are moved rearward by the internal screws 33 and 34 while being washed with water and are discharged through a discharge port 32 of the classifying drum 3. A member 36 is a rod for supporting the classifying drum 3.

In the above-described arrangement of the present invention, sand including fine sand is sedimented in the buckets 14, and cement water is separated from the sand by being caused to overflow by inclining the buckets 14. It is therefore possible to effectively recover sand including fine sand.

From the above-described drain-off drum 1 having the buckets 14, cement water is discharged to the outside and aggregates from which water is removed can be supplied to the classifying drum 3. It is therefore possible to recover aggregates reusable as aggregates for freshly mixed concrete by using only a small amount of resupplied water. Even if water used for washing a mixer of a concrete mixer truck, i.e., returned concrete is processed together, the rate at which fine sand or the like flows out of the apparatus by disturbed flow is limited to a very small value even when truck washing water and returned concrete are supplied simultaneously, since surplus water or cement water is discharged through the drain holes 17 and the overflow holes 18. It is therefore possible to suitably recover aggregates.

What is claimed is:

1. A tandem waterwheel trommel apparatus comprising:

a main body formed by integrally coupling a laterally-disposed drain-off drum and a classifying drum by a pipe, said main body having a front end and a rear end, said drain-off drum disclosed toward said front end and said classifying drum disposed toward said rear end;

a base provided under said main body to rotatably support said main body;

a drive unit provided on said base and connected to said main body to rotate said main body;

a front end plate and a rear end plate each having a generally toroidal shape and respectively formed at opposite ends of said drain-off drum;

a plurality of buckets formed on an inner surface of said drain-off drum said buckets each having an advancing side facing the direction of rotation of said drain-off drum, a trailing side facing away from the direction of rotation of said drain-off drum, and an inner end portion disposed inwardly away from said drain-off drum inner surface;

gutters provided on said trailing side of said inner end portions of said buckets;

drain holes formed in said rear end plate so as to communicate with said gutters to provide fluid communication between the outside of said main body and said gutters;

overflow holes formed in said rear end plate proximate said drain holes;

a fixed chute provided inside said drain-off drum, extending to said classifying drum and inclined so as to be reduced in level from said drain-off drum to said classifying drum;

said classifying drum having a front cylindrical portion and a rear truncated-cone portion disposed so that said front cylindrical portion is generally between said drain-off drum and said rear truncated-cone portion, said truncated-cone portion being formed by a porous plate defining its circumferential surface, said cylindrical portion being formed by wire netting defining its circumferential surface;

a fixed bath for partially accommodating said classifying drum, said fixed bath having a circular-arc shape in a transverse section and having a bath front end portion and a bath rear end portion, with said bath front end portion disposed closer to said drain-off drum than said bath rear end portion is disposed to said drain-off drum;

said cylindrical portion having on its outer surface a screw rotatable in said fixed bath;

said fixed bath having a channel formed in its bath rear end portion, said channel having a circular-arc shape in a transverse section;

scoop-up buckets provided on said classifying drum and formed so as to be rotatable in said channel; and a spraying nozzle provided above said classifying drum.

2. A tandem waterwheel trommel apparatus comprising:

a base;

a rotatable main body rotatably mounted on said base, said rotatable main body comprising a drain-off drum coupled to a classifying drum with said drain-off drum, and said classifying drum having a churn opening therebetween;

a drive unit mounted on said base and operably connected to said main body to rotate said main body;

a front end plate and a rear end plate formed at opposite sides of said drain-off drum;

a plurality of buckets formed on an inner surface of said drain-off drum; gutters disposed on said buckets;

drain holes formed in said rear end plate so as to provide fluid communication between the outside of said main body and said gutters;

overfill holes formed in said rear end plate proximate said drain holes;

a fixed chute disposed in said drain-off drum and extending into said classifying drum through said chute opening;

scoop-up buckets disposed on said classifying drum so as to rotate therewith; and a spraying nozzle positioned above said classifying drum.

* * * * *

UNITED STATES PATENT AND TRADEMARK OFFICE
CERTIFICATE OF CORRECTION

PATENT NO. : 5,490,928
DATED : February 13, 1996
INVENTOR(S) : Tanii

It is certified that error appears in the above-identified patent and that said Letters Patent is hereby corrected as shown below:

Column 5:

Claim 1, line 5, "disclosed" should be --disposed--.

Claim 1, line 15, "drain-off drum said buckets" should be --drain-off drum, said buckets--.

Column 6:

Claim 2, line 6, "a chum" should be --a chute--.

Claim 2, line 17, "overfill holes" should be --overflow holes--.

Signed and Sealed this

Twenty-fifth Day of June, 1996

Attest:

BRUCE LEHMAN

Attesting Officer     Commissioner of Patents and Trademarks